United States Patent
Zhang

(10) Patent No.: US 12,437,748 B2
(45) Date of Patent: Oct. 7, 2025

(54) SPOKEN LANGUAGE PROCESSING METHOD AND APPARATUS, AND STORAGE MEDIUM

(71) Applicant: Beijing Baidu Netcom Science Technology Co., Ltd., Beijing (CN)

(72) Inventor: Yinhui Zhang, Beijing (CN)

(73) Assignee: BEIJING BAIDU NETCOM SCIENCE TECHNOLOGY CO., LTD., Beijing (CN)

(*) Notice: Subject to any disclaimer, the term of this patent is extended or adjusted under 35 U.S.C. 154(b) by 284 days.

(21) Appl. No.: 17/965,869

(22) Filed: Oct. 14, 2022

(65) Prior Publication Data

US 2023/0317058 A1    Oct. 5, 2023

(30) Foreign Application Priority Data

Mar. 29, 2022  (CN) .......................... 202210323762.X

(51) Int. Cl.
  *G10L 15/02*    (2006.01)
  *G06F 17/16*    (2006.01)
  (Continued)

(52) U.S. Cl.
  CPC .............. *G10L 15/02* (2013.01); *G06F 17/16* (2013.01); *G06F 18/2415* (2023.01);
  (Continued)

(58) Field of Classification Search
  CPC ....... G10L 15/02; G10L 15/183; G06F 17/16; G06F 18/2415; G06F 18/253;
  (Continued)

(56) References Cited

U.S. PATENT DOCUMENTS 11,024,194 B1 * 6/2021 Beigman Klebanov .....................
                                                              G09B 17/04
2020/0401938 A1 * 12/2020 Etkin ...................... G06N 5/022
(Continued)

FOREIGN PATENT DOCUMENTS

CA        2945632 C  *  4/2021  ........... G06F 16/335
CN      102262632 A  * 11/2011  ........... G06F 17/278
(Continued)

OTHER PUBLICATIONS

Supplemental Search Report issued on Jul. 19, 2023 by the CIPO in the corresponding Patent Application No. 202210323762X, with English translation.
(Continued)

*Primary Examiner* — Edwin S Leland, III
(74) *Attorney, Agent, or Firm* — NORTON ROSE FULBRIGHT US LLP

(57) ABSTRACT

Spoken language processing method and apparatus, a device, and a storage medium, which relate to the field of artificial intelligence and, in particular, to the fields of deep learning, natural-language understanding, intelligent customer service, and the like. The specific implementation solution includes: determining a word feature of a word in spoken text information; determining a correlation feature of the word in the spoken text information; and determining an effect of the word on fluency of the spoken text information according to the word feature of the word and the correlation feature of the word.

9 Claims, 5 Drawing Sheets

(51) Int. Cl.
  *G06F 18/2415* (2023.01)
  *G06F 18/25* (2023.01)
  *G06F 40/166* (2020.01)
  *G06F 40/20* (2020.01)
  *G06F 40/279* (2020.01)
  *G06F 40/30* (2020.01)
  *G06N 3/045* (2023.01)
  *G06N 3/08* (2023.01)
  *G10L 15/183* (2013.01)

(52) U.S. Cl.
  CPC .......... *G06F 18/253* (2023.01); *G06F 40/166* (2020.01); *G06F 40/20* (2020.01); *G06F 40/279* (2020.01); *G06F 40/30* (2020.01); *G06N 3/045* (2023.01); *G06N 3/08* (2013.01); *G10L 15/183* (2013.01)

(58) Field of Classification Search
  CPC ...... G06F 40/166; G06F 40/20; G06F 40/279; G06F 40/30; G06N 3/045; G06N 3/08
  USPC .......................................................... 704/251
  See application file for complete search history.

(56) References Cited

U.S. PATENT DOCUMENTS

| | | | | |
|---|---|---|---|---|
| 2021/0216722 A1* | 7/2021 | Dai | ........... | G06F 40/30 |
| 2021/0374338 A1* | 12/2021 | Shrivastava | ........... | G06F 40/30 |
| 2021/0383069 A1* | 12/2021 | Liu | ........... | G06F 40/30 |
| 2023/0317058 A1* | 10/2023 | Zhang | ........... | G06F 40/20 |
| | | | | 704/251 |

FOREIGN PATENT DOCUMENTS

| | | | | | |
|---|---|---|---|---|---|
| CN | 104347071 A | * | 2/2015 | | |
| CN | 106502979 A | * | 3/2017 | ........... | G06F 40/242 |
| CN | 109493968 A | * | 3/2019 | ........... | G06F 17/277 |
| CN | 110427625 A | * | 11/2019 | ........... | G06F 16/3329 |
| CN | 104347071 B | | 2/2020 | | |
| CN | 110959159 A | * | 4/2020 | ........... | G06F 3/167 |
| CN | 111291549 A | * | 6/2020 | ........... | G06F 16/355 |
| CN | 111581968 A | * | 8/2020 | ........... | G06F 40/289 |
| CN | 111667816 A | * | 9/2020 | ........... | G06N 3/045 |
| CN | 111737995 A | * | 10/2020 | ........... | G06F 18/2415 |
| CN | 112016313 A | * | 12/2020 | ........... | G06F 40/126 |
| CN | 112115721 A | * | 12/2020 | ........... | G06F 18/253 |
| CN | 112149418 A | * | 12/2020 | | |
| CN | 112380845 A | * | 2/2021 | ........... | G06F 40/194 |
| CN | 112417117 A | * | 2/2021 | ........ | G06F 16/3329 |
| CN | 112559688 A | * | 3/2021 | | |
| CN | 112735396 A | * | 4/2021 | ........... | G06F 18/214 |
| CN | 112818694 A | * | 5/2021 | | |
| CN | 113160820 A | * | 7/2021 | ........... | G10L 15/02 |
| CN | 113204619 A | * | 8/2021 | ........ | G06F 16/3329 |
| CN | 113704430 A | * | 11/2021 | | |
| CN | 113903048 A | * | 1/2022 | | |
| CN | 114005452 A | * | 2/2022 | ........... | G06N 3/045 |
| CN | 114021582 A | * | 2/2022 | | |
| CN | 114141236 A | * | 3/2022 | | |
| CN | 114566147 A | * | 5/2022 | ........... | G10L 15/01 |
| CN | 115623279 A | * | 1/2023 | ........... | G06F 16/432 |
| CN | 114970666 B | * | 8/2023 | ........... | G06F 40/20 |
| TW | 202009890 A | * | 3/2020 | ........... | G06F 40/30 |
| WO | WO-2022022421 A1 | * | 2/2022 | ........... | G06F 16/355 |
| WO | WO-2022156115 A1 | * | 7/2022 | ........ | G06F 16/3344 |

OTHER PUBLICATIONS

European Search Report issued on Aug. 4, 2023 in the corresponding Patent Application No. 22201744.4-1203.
Bamdev, et al.: "Automated Speech Scoring System Under The Lens Evaluating and interpreting the linguistic cues for language proficiency," Int'l J. of Artifical Intelligence in Education, arXiv:2111.15156v1 [cs.CL], (2021), pp. 1-37.
Office Action issued on Jun. 15, 2023 by the CIPO in the corresponding Patent Application No. 202210323762.X, with English translation.
Search Report issued on Jun. 13, 2023 by the CIPO in the corresponding Patent Application No. 202210323762.X, with English translation.
Aida, et al.: "A Comprehensive Analysis of PMI-based Models for Measuring Semantic Differences," Proceedings of 35th Pacific Asia Conf. on Language, Information, and Computation, (2021), pp. 1-11.
Jiawei Huang: "Research on Intent Classification in Dialogue Systems," Thesis, School of Computer Central China Normal Univ., (2018), pp. 1-70, with English Abstract.
Linxiu Zhang: "Research on Names Entity Recognition Method for Weibo Text," Thesis, Database Information Technology Series, (2019), pp. 1-68, with Engish Abstract.
Xu, et al.: "Intention Detection in Spoken Language Based in Context Information," Computer Science, (2019), pp. 1-7; http://www.jsjkx.com, with English Abstract.

* cited by examiner $$\begin{bmatrix} 0 & 1 & 2 & 3 & 4 & 5 & 6 & 7 & 8 & 9 \\ -1 & 0 & 1 & 2 & 3 & 4 & 5 & 6 & 7 & 8 \\ -2 & -1 & 0 & 1 & 2 & 3 & 4 & 5 & 6 & 7 \\ -3 & -2 & -1 & 0 & 1 & 2 & 3 & 4 & 5 & 6 \\ -4 & -3 & -2 & -1 & 0 & 1 & 2 & 3 & 4 & 5 \\ -5 & -4 & -3 & -2 & -1 & 0 & 1 & 2 & 3 & 4 \\ -6 & -5 & -4 & -3 & -2 & -1 & 0 & 1 & 2 & 3 \\ -7 & -6 & -5 & -4 & -3 & -2 & -1 & 0 & 1 & 2 \\ -8 & -7 & -6 & -5 & -4 & -3 & -2 & -1 & 0 & 1 \\ -9 & -8 & -7 & -6 & -5 & -4 & -3 & -2 & -1 & 0 \end{bmatrix}$$

SPOKEN LANGUAGE PROCESSING METHOD AND APPARATUS, AND STORAGE MEDIUM

CROSS-REFERENCE TO RELATED APPLICATION

This application claims priority to Chinese Patent Application No. CN202210323762.X, filed on Mar. 29, 2022, the disclosure of which is incorporated herein by reference in its entirety.

TECHNICAL FIELD

The present disclosure relates to the field of artificial intelligence (AI) and, in particular, to the fields of deep learning, natural-language understanding (NLU), intelligent customer service, and the like. For example, a spoken language processing method and apparatus, an electronic device, and a storage medium are disclosed.

BACKGROUND

NLU is a general term for all methodological models or tasks that support machines in understanding text content. The NLU plays a very important role in a text information processing system and is a necessary module in a recommendation, question answering, search system or the like.

A spoken language of a user refers to the language used for daily talking. The spoken language of the user greatly differs from a written language mainly in that a spoken text contains many non-fluent factors compared with a written text. How to process the spoken language is an important issue in the industry.

SUMMARY

The present disclosure provides a spoken language processing method and apparatus, a device, and a storage medium.

According to an aspect of the present disclosure, a spoken language processing method is provided. The method includes the steps described below.

A word feature of a word in spoken text information is determined.

A correlation feature of the word in the spoken text information is determined.

An effect of the word on fluency of the spoken text information is determined according to the word feature of the word and the correlation feature of the word.

According to an aspect of the present disclosure, a spoken language processing apparatus is provided. The apparatus includes a word feature module, a correlation feature module, and a fluency effect module.

The word feature module is configured to determine a word feature of a word in spoken text information.

The correlation feature module is configured to determine a correlation feature of the word in the spoken text information.

The fluency effect module is configured to determine an effect of the word on fluency of the spoken text information according to the word feature of the word and the correlation feature of the word.

According to another aspect of the present disclosure, an electronic device is provided. The electronic device includes at least one processor and a memory.

The memory is communicatively connected to the at least one processor.

The memory stores an instruction executable by the at least one processor to enable the at least one processor to perform the spoken language processing method according to any embodiment of the present disclosure.

According to another aspect of the present disclosure, a non-transitory computer-readable storage medium is provided. The non-transitory computer-readable storage medium is configured to store a computer instruction for causing a computer to perform the spoken language processing method according to any embodiment of the present disclosure.

According to the technology of the present disclosure, the accuracy of spoken language processing is improved.

It is to be understood that the content described in this part is neither intended to identify key or important features of embodiments of the present disclosure nor intended to limit the scope of the present disclosure. Other features of the present disclosure are apparent from the description provided hereinafter.

BRIEF DESCRIPTION OF THE DRAWINGS

The drawings are intended to provide a better understanding of the solution and not to limit the present disclosure. In the drawings.

DETAILED DESCRIPTION

Example embodiments of the present disclosure, including details of embodiments of the present disclosure, are described hereinafter in conjunction with drawings to facilitate understanding. The example embodiments are illustrative only. Therefore, it is to be appreciated by those of ordinary skill in the art that various changes and modifications may be made to the embodiments described herein without departing from the scope and spirit of the present disclosure. Similarly, description of well-known functions and constructions is omitted hereinafter for clarity and conciseness.

Figure 1:
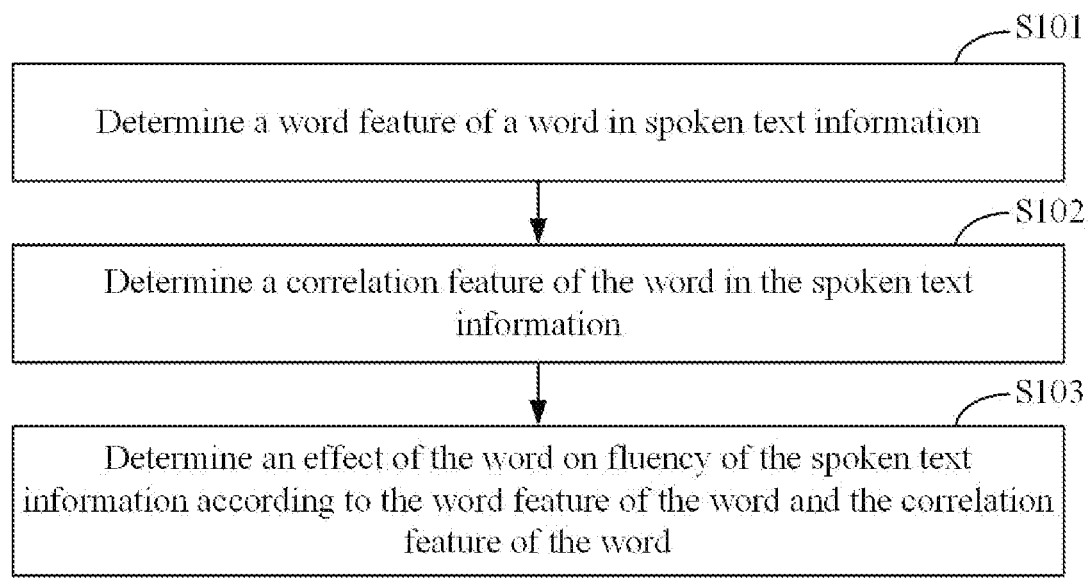
FIG. 1 is a flowchart of a spoken language processing method according to an embodiment of the present disclosure.

FIG. 1 is a flowchart of a spoken language processing method according to an embodiment of the present disclosure. The embodiment of the present disclosure is applicable to the case where spoken content is processed. The method may be performed by a spoken language processing apparatus. The apparatus may be implemented by software and/or hardware and integrated into an electronic device having a spoken language processing function. As shown in FIG. 1, the spoken language processing method in this embodiment may include S101 to S103.

In S101, a word feature of a word in spoken text information is determined.

In S102, a correlation feature of the word in the spoken text information is determined.

In S103, an effect of the word on fluency of the spoken text information is determined according to the word feature of the word and the correlation feature of the word.

The spoken text information is text information in an oral communication process. There are non-fluent factors in the oral communication process, such as repetition, pause, and redundancy, resulting in noisy words or non-fluent words in the spoken text information. In the oral communication process, speech information may be collected and recognized through automatic speech recognition (ASR), so as to obtain the spoken text information.

The word feature of the word is used for representing feature information of the word itself. The correlation feature is used for representing a correlation of the word in the spoken text information. The correlation feature of the word may include a cross-correlation between different words and may also include an autocorrelation of the word itself, that is, the correlation of the word with itself. The correlation of the word indicates a degree of relevance of the word in semantics, and the autocorrelation of the word itself is greater than the cross-correlation between different words.

In the embodiment of the present disclosure, the effect of the word on the fluency of the spoken text information may be different degrees of fluency. Optionally, the effect may be fluency or non-fluency. If the effect is non-fluency, it indicates that the word causes the non-fluency of the spoken text information. In an optional embodiment, in the case where the word is a Chinese modal particle, an echo word, a repetition, or the like, the word will cause the non-fluency of the spoken text information.

For example, the word feature of the word in the spoken text information may be determined, and the correlation feature of the word in the spoken text information may be determined. It is to be noted that the word feature of the word is parallel to the correlation feature of the word in relationship, and the word feature and the correlation feature of the word are determined in no sequence. The determination sequence of the word feature and the correlation feature is not limited in embodiments of the present disclosure.

For example, the effect of the word on the fluency of the spoken text information may be determined according to the correlation feature of the word and the word feature of the word. In the process of determining the effect of a word on text fluency, the word feature of the word itself is used as a determination basis so that a word with no actual meaning in the spoken text information can be recognized in the determination process, which is generally a Chinese modal particle such as aye, na, yep, hi, ah, oh, yeah, ya, em, naw, nah and this or an echo word such as that, or what, is equivalent to, and that is to say. The correlation feature of the word is also used as a determination basis so that repetitive words can be recognized in the determination process. Not only the word feature of the word itself in the spoken text information is included but also the correlation feature of the word is fused in the process of spoken text processing so that the effect of the word on the text fluency can be accurately obtained.

According to the technical solution provided by the embodiment of the present disclosure, the word feature of the word itself and the correlation feature of the word in the spoken text information are determined separately, and the effect of the word on the text fluency is determined in conjunction with the word feature of the word itself and the correlation feature of the word so that the effect of the word on the text fluency can be accurately obtained.

In an optional implementation, that the correlation feature of the word in the spoken text information is determined includes: determining a word vector matrix of the word in the spoken text information; and determining the correlation feature of the word according to the word vector matrix of the word.

In the embodiment of the present disclosure, the spoken text information is processed so that the word vector matrix of the word in the spoken text information is obtained, and the correlation feature of the word is determined according to the word vector matrix of the word. The word vector matrix of the word is used for a numerical representation of the word. The dimension of the word vector matrix may be denoted as n. The dimension of the word vector matrix is not specifically limited in the embodiment of the present disclosure, for example, may be 128-dimensional or 256-dimensional. For example, a correlation matrix of the word in the spoken text information may be constructed according to the word vector matrices of words in the spoken text information, and feature extraction is performed on the correlation matrix so that the correlation feature of the word is obtained. Additionally, the word feature of the word may be determined according to the word vector matrix of the word. The word feature of the word and the correlation feature of the word are determined by the word vector matrix of the word, separately, laying a foundation for the subsequent spoken language processing through a neural network.

Figure 2A:
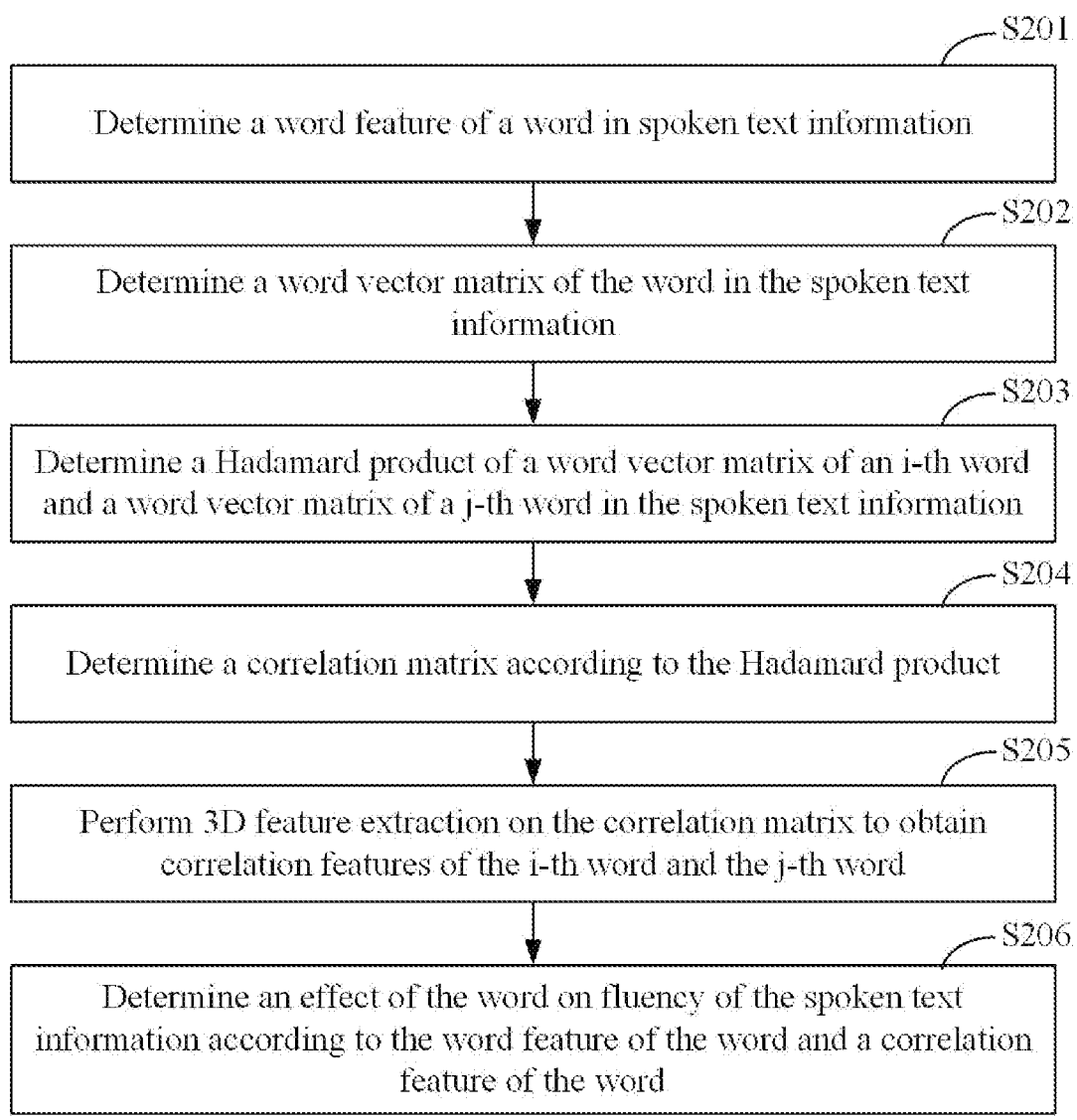
FIG. 2A is a flowchart of another spoken language processing method according to an embodiment of the present disclosure.

FIG. 2A is a flowchart of another spoken language processing method according to an embodiment of the present disclosure. In this embodiment, an optional solution is provided based on the preceding embodiment and spoken language processing can be performed based on a neural network. Referring to FIG. 2A, the spoken language processing method provided in this embodiment includes S201 to S206.

In S201, a word feature of a word in spoken text information is determined.

In S202, a word vector matrix of the word in the spoken text information is determined.

In S203, a Hadamard product of a word vector matrix of an i-th word and a word vector matrix of a j-th word in the spoken text information is determined.

In S204, a correlation matrix is determined according to the Hadamard product.

In S205, three-dimensional (3D) feature extraction is performed on the correlation matrix to obtain correlation features of the i-th word and the j-th word.

In S206, an effect of the word on fluency of the spoken text information is determined according to the word feature of the word and a correlation feature of the word.

In the above, i and j are natural numbers.

The Hadamard product is a type of operation of matrices. If matrix $A=(a_{ij})$ and matrix $B=(b_{ij})$ are two matrices of the same order and $c_{ij}=a_{ij} \times b_{ij}$, matrix $C=(c_{ij})$ is the Hadamard product of matrix A and matrix B, where $a_{ij}$, $b_{ij}$, and $c_{ij}$ are elements in matrix A, matrix B, and matrix C, respectively.

In the embodiment of the present disclosure, the correlation matrix of the i-th word and the j-th word may be determined according to the Hadamard product of the word vector matrix of the i-th word and the word vector matrix of the j-th word in the spoken text information, where word numbers i and j are both smaller than the number m of words in the spoken text information, and the value of each of i and j may be 1, 2, . . . , m, that is, i and j may have the same value or different values, where m is a natural number. The correlation matrix of the spoken text information is determined according to the Hadamard product, for example, the Hadamard product of the words in the spoken text information may be directly used as a correlation matrix. Using an example in which the dimension of the word vector matrix is n, the dimension of the correlation matrix is m×m×n. An (i×j)-th n-dimensional matrix represents the correlation between the word vector matrix of the i-th word and the word vector matrix of the j-th word, and the value of the (i×j)-th n-dimensional matrix may be the Hadamard product of the word vector matrix of the i-th word and the word vector matrix of the j-th word.

Moreover, the 3D feature extraction, that is, three-dimensional feature extraction may be performed on the correlation matrix. For example, the 3D feature extraction may be performed using a 3D neural network so that the correlation feature of the word is obtained. The convolution kernel of the 3D neural network is also three-dimensional. The size of a 3D convolution kernel is affected by a receptive field. The size of the 3D convolution kernel is not specifically limited in the embodiment of the present disclosure. The receptive field is a size of a region of an input image of a convolutional neural network to which a pixel on a feature map output from each layer of the convolutional neural network is mapped. The correlation matrix is determined according to the Hadamard product of the word vector matrix of the i-th word and the word vector matrix of the j-th word in the spoken text information so that the correlation matrix can accurately reflect the correlation of the word, thereby improving the accuracy of the correlation matrix. Moreover, the 3D feature extraction is performed on the correlation matrix, and the extraction of the correlation matrix based on the neural network is supported so that the determination efficiency of the correlation matrix can be improved.

In an optional implementation, that the correlation matrix is determined according to the Hadamard product includes: determining relative position encoding of the i-th word and the j-th word in the spoken text information; and adding the relative position encoding to the Hadamard product to obtain the correlation matrix of the i-th word and the j-th word.

In the relative position encoding, a relative position is represented by a difference between position numbers of words in the spoken text information, and the value of the relative position encoding of the i-th word and the j-th word is H. Using an example in which the spoken text information includes m words, the dimension of a relative position encoding matrix is also m×m. since the value ranges of i and j are 1, 2, . . . , m, the value range of i–j is 0, 1, . . . , m–1. For example, one sentence has 10 words, and the relative position encoding matrix of the sentence is shown in FIG. 2B.

In the embodiment of the present disclosure, the relative position encoding of words in the spoken text information may also be introduced into the correlation matrix. For example, the relative position encoding matrix may be introduced into the last dimension of the correlation matrix so that an integrated correlation matrix is obtained. For example, if the spoken text information includes m words and the dimension of the word vector matrix is n, the dimension of the correlation matrix is m×m×(n+1). The relative position encoding of the words in the spoken text information is introduced into the correlation matrix so that the correlation matrix can reflect non-fluency due to an abnormal word sequence in a spoken text and can solve the problem of position sensitivity in the spoken text (for example, a repetition often occurs at an adjacent position). In this manner, the accuracy of word processing can be further improved.

According to the technical solution provided by the embodiment of the present disclosure, the correlation matrix is determined according to the Hadamard product of the word vector matrices of the words in the spoken text information, the relative position encoding may also be introduced into the correlation matrix, and the extraction of the correlation matrix based on the neural network is supported so that the determination efficiency and accuracy of the correlation matrix can be improved.

Figures 2B, 3A:
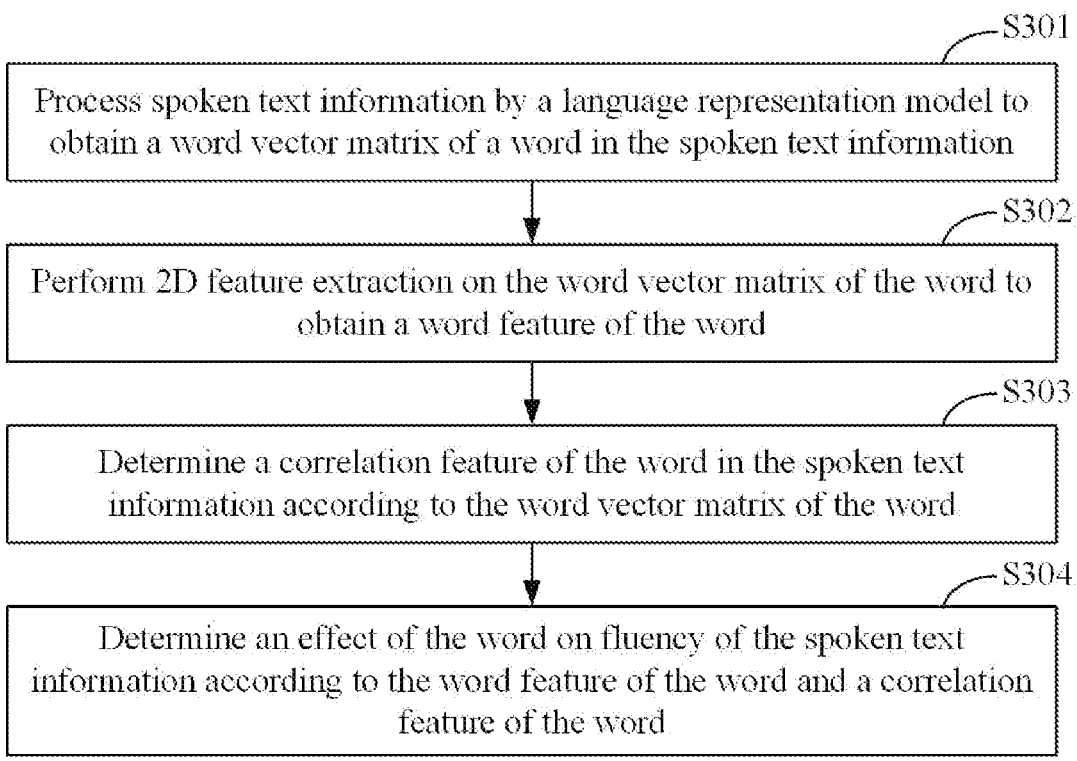
FIG. 2B is a schematic diagram of relative position encoding according to an embodiment of the present disclosure.
FIG. 3A is a flowchart of another spoken language processing method according to an embodiment of the present disclosure.

FIG. 3A is a flowchart of another spoken language processing method according to an embodiment of the present disclosure. In this embodiment, an optional solution is provided based on the preceding embodiment. Referring to FIG. 3A, the spoken language processing method provided in this embodiment includes S301 to S304.

In S301, spoken text information is processed by a language representation model so that a word vector matrix of a word in the spoken text information is obtained.

In S302, two-dimensional (2D) feature extraction is performed on the word vector matrix of the word so that a word feature of the word is obtained.

In S303, a correlation feature of the word in the spoken text information is determined according to the word vector matrix of the word.

In S304, an effect of the word on fluency of the spoken text information is determined according to the word feature of the word and the correlation feature of the word.

The language representation model (e.g., Bidirectional Encoder Representations from Transformers (BERT) model) may be pre-trained for determining the word vector matrix of the word. For example, the spoken text information may be input to the language representation model so that the word vector matrix of the word in the spoken text information is obtained. The dimension n of the word vector matrix may be 128 or 256. A task for training the language representation model is not specifically limited in the embodiment of the present disclosure. For example, the language representation model may be pre-trained through tasks of a text such as machine translation and syntactic analysis.

In the embodiment of the present disclosure, the 2D feature extraction, that is, two-dimensional feature extraction, may be performed on the word vector matrix of the word in the spoken text information. For example, the 2D feature extraction may be performed using a 2D neural network so that the word feature of the word is obtained. The convolution kernel of the 2D neural network is two-dimensional. The size of the convolution kernel is affected by a receptive field. The size of a 2D convolution kernel is not specifically limited in the embodiment of the present disclosure. The 2D feature extraction is performed on the word vector matrix of the word so that the word feature of the word itself is obtained, and the extraction of the word feature based on the neural network is supported so that the determination efficiency of the word feature of the word can be improved. Moreover, the word feature and an autocorrelation matrix may have the same dimension and may both be, for example, three-dimensional, laying a foundation for the subsequent processing of words according to an autocorrelation feature and the word feature of the word.

Figure 3B:
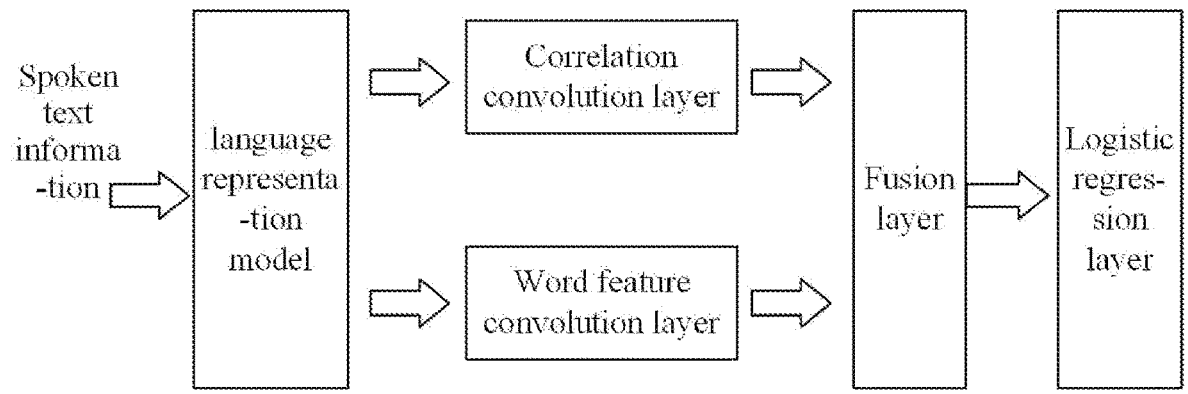
FIG. 3B is an architecture diagram of a process of spoken language processing according to an embodiment of the present disclosure.

FIG. 3B is an architecture diagram of a process of spoken language processing according to an embodiment of the present disclosure. Referring to FIG. 3B, the word vector matrices of the words in the spoken text information are determined separately through the language representation model, and the word vector matrices of the words in the spoken text information are combined into a text vector matrix of the spoken text information. Still using an example in which the spoken text information includes m words and the dimension of the word vector matrix of each word is n, the dimension of the text vector matrix of the spoken text information is m×n. Moreover, the correlation features of the words in the spoken text information may be determined according to the text vector matrix of the spoken text information through a correlation convolution layer; the word features of the words themselves in the spoken text information may be determined according to the text vector matrix of the spoken text information through a word feature convolution layer; the word features of the words themselves and the correlation features of the words may be fused through a fusion layer so that fusion features are obtained; and the fusion features are processed through a softmax (logistic regression) layer so that effect categories of the words on the fluency of the spoken text information are obtained. The fusion layer may be a 1×1 convolution layer.

Figure 3C:
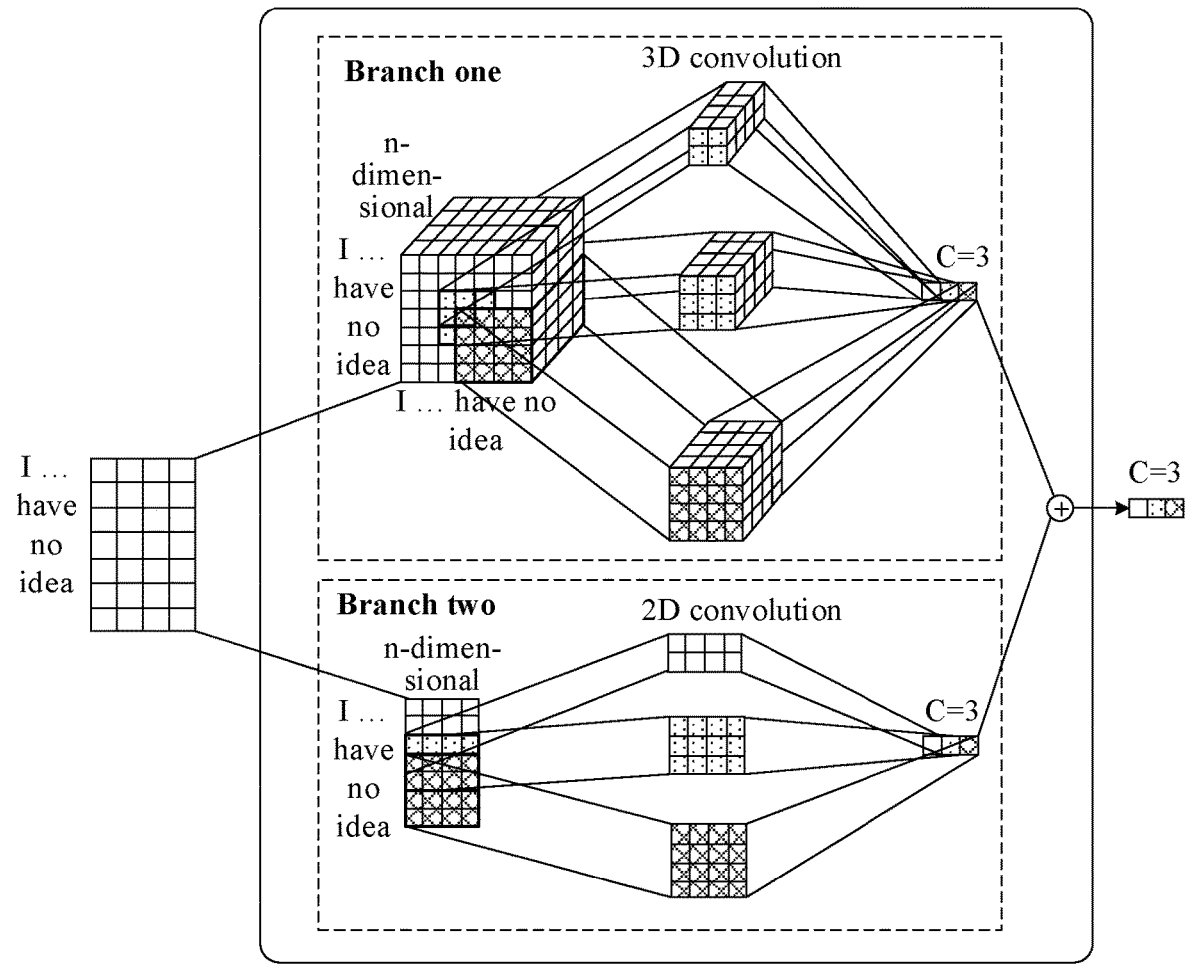
FIG. 3C is a schematic diagram of feature processing according to an embodiment of the present disclosure.

FIG. 3C is a schematic diagram of feature processing according to an embodiment of the present disclosure. Referring to FIG. 3C, using an example in which the spoken text information is "I . . . have no idea", the spoken text information includes m words, the dimension of the word vector matrix of each word is n, the word vector matrices of the words may constitute an (m×n)-dimensional text vector matrix, and the (m×n)-dimensional text vector matrix is input to branch one and branch two, separately. In branch one, the Hadamard product of the word vector matrix of the i-th word and the word vector matrix of the j-th word in the spoken text information may be determined, that is to say, for each word in "I . . . have no idea", the Hadamard products of the word vector matrix of this word and the word vector matrices of the words in "I . . . have no idea" may be determined separately so that an (m×m×n)-dimensional correlation matrix is obtained. For example, if the spoken text information includes seven words and the word vector matrix of each word is 128-dimensional, the dimension of the correlation matrix is 7×7×128. In branch one, the relative position encoding of the words may also be introduced into the correlation matrix so that the (m×m×n)-dimensional correlation matrix is converted into an (m×m×(n+1))-dimensional correlation matrix (not shown). Moreover, the 3D feature extraction may be performed on the correlation matrix through a 3D convolution layer so that the correlation features are obtained. In branch two, the 2D feature extraction is performed on the (m×n)-dimensional text vector matrix through a 2D convolution layer so that the word features of the words are obtained. In the embodiment of the present disclosure, the word features of the words and the correlation features of the words may also be fused so that the fusion features are obtained for subsequently determining the effect categories of the words in the spoken text information according to the fusion features. The number of channels of the correlation features, the number of channels of the word features, and the number of channels of the fusion features are all the same, for example, the number C of channels may be 3.

The above two branches may be formally expressed as follows:

$$Y = RELU((A \times X1) \odot (B \times X2) + b).$$

X1 and X2 denote the correlation feature and the word feature of the word itself, respectively, Y denotes the effect category of the word on the fluency of the spoken text information, A and B denote weight values, b denotes a bias vector, RELU denotes an activation function, and ⊙ denotes a feature fusion operator, for example, may be a Hadamard product operator, that is, the word feature of the word itself and the correlation feature may be fused together by the Hadamard product. The bias vector b is added to a fusion result and input together to the activation parameter. The softmax layer may output the probability distribution of the word on candidate categories, and a candidate category with a maximum probability distribution is used as the effect category of the word on the fluency of the spoken text information.

It is to be noted that to improve the learning efficiency of the neural network, dropout may also be performed in a model training process. The dropout refers to that a neural network unit is temporarily dropped out of the network according to a certain probability in the process of training a deep learning network. The dropout probability may be 0.5.

According to the technical solution provided by the embodiment of the present disclosure, the processing efficiency of the spoken text is improved through a fully convolutional network architecture; the word vector matrix of the word is generated using the language representation model; the word vector matrix is processed using an autocorrelation convolution network so that the correlation matrix is obtained; and the relative position encoding is introduced into the correlation matrix and a bias model is forced to extract relative position information so that the convolutional neural network can locate the relative position information of the words, and the processing accuracy and efficiency of the words can be improved.

In an optional implementation, the method further includes: correcting the spoken text information according to the category to which the word belongs to obtain target text information.

In the embodiment of the present disclosure, the word in the spoken text information may also be corrected for the category to which the word belongs. The category to which the word belongs includes fluency, repetition, redundancy, correction, incomplete word substitution or insertion, and the like. For example, the following six cases are described below.

Case one is a simple repetition. In this type, the corrected words are the same as the to-be-corrected words, which may be caused by a stammer of a speaker. For example, the original spoken text information is "I know I know that means is more complex", and the corrected spoken text information is "I know that means is more complex". Case two is a partial repetition which refers to that only a few words in a phrase are repeated, and the to-be-corrected words are part of the corrected words. For example, the original spoken text information is "those naugh-naughty children of ours", and the corrected spoken text information is "those naughty children of ours". Case 3 is a word substitution. In this type, there is an intersection between the corrected words and the to-be-corrected words which are not exactly the same. For example, the original spoken text information is "I think the scene then at that time was to be very hot", and the corrected spoken text information is "I think the scene at that time was to be very hot". Case four is a word deletion. In this type, the to-be-corrected word is completely deleted and there is no corrected word for its correction. For example, the original spoken text information is "But I feel quite very frustrated myself", and the corrected spoken text information is "But I feel very frustrated myself". Case 5 is a word insertion. In this type, the to-be-corrected words are a subset of the corrected words, and the corrected words are a supplement based on the to-be-corrected words. For example, the original spoken text information is "Zhang San also has his own home also has a bed", and the corrected spoken text information is "Zhang San's own home also has a bed". Case 6 is a complex type consisting of the above five simple types which are embedded. For example, the original spoken text information is "Yes, gone back at the end of January first January", and the corrected spoken text information is "Yes, gone back at the end of January". It is to be noted that the to-be-corrected words are words to be corrected in the spoken text information, and the corrected words are a correction result. The word is corrected according to the category of the word in the spoken text information so that the target text information is obtained, and the quality of the spoken text can be improved.

In an optional implementation, the method further includes: performing natural-language understanding on the target text information.

The natural-language understanding may be syntactic analysis, machine translation, and the like. The natural-language understanding is usually trained by using relatively fluent and standard texts as samples. However, the spoken text information has multiple non-fluency phenomena such as repetition and redundancy, which cause serious interference to the natural-language understanding. The spoken text information is corrected so that the target text information is obtained. In this manner, the spoken text information is written and the natural-language understanding is performed based on the target text information so that the quality of natural-language understanding in the oral communication process can be improved.

Figure 4:
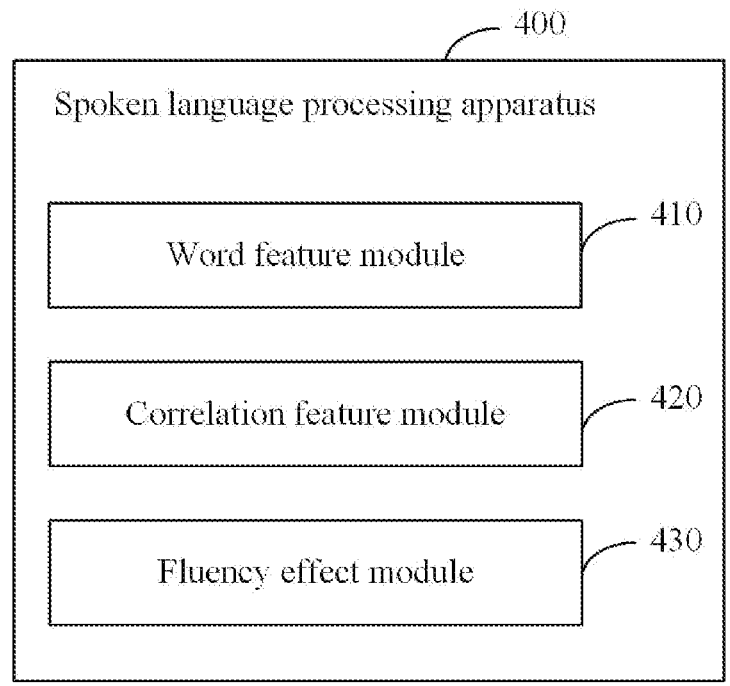
FIG. 4 is a structural diagram of a spoken language processing apparatus according to an embodiment of the present disclosure.

FIG. 4 is a structural diagram of a spoken language processing apparatus according to an embodiment of the present disclosure. The embodiment of the present disclosure is applicable to the case where spoken content is processed. The apparatus may be implemented by software and/or hardware, and the apparatus may implement the spoken language processing method according to any embodiment of the present disclosure. As shown in FIG. 4, a spoken language processing apparatus 400 includes a word feature module 410, a correlation feature module 420, and a fluency effect module 430.

The word feature module 410 is configured to determine a word feature of a word in spoken text information.

The correlation feature module 420 is configured to determine a correlation feature of the word in the spoken text information.

The fluency effect module 430 is configured to determine an effect of the word on fluency of the spoken text information according to the word feature of the word and the correlation feature of the word.

In an optional implementation, the correlation feature module 420 includes a word vector matrix submodule and a correlation feature submodule.

The word vector matrix submodule is configured to determine a word vector matrix of the word in the spoken text information.

The correlation feature submodule is configured to determine the correlation feature of the word according to the word vector matrix of the word.

In an optional implementation, the correlation feature submodule includes a Hadamard product unit, a correlation matrix unit, and a correlation feature unit.

The Hadamard product unit is configured to determine a Hadamard product of a word vector matrix of an i-th word and a word vector matrix of a j-th word in the spoken text information.

The correlation matrix unit is configured to determine a correlation matrix according to the Hadamard product.

The correlation feature unit is configured to perform 3D feature extraction on the correlation matrix to obtain correlation features of the i-th word and the j-th word.

In the above, i and j are natural numbers.

In an optional implementation, the correlation matrix unit includes a relative position encoding subunit and a correlation feature subunit.

The relative position encoding subunit is configured to determine relative position encoding of the i-th word and the j-th word in the spoken text information.

The correlation feature subunit is configured to add the relative position encoding to the Hadamard product to obtain the correlation matrix of the word.

In an optional implementation, the word vector matrix submodule is configured to process the spoken text information by a BERT model to obtain the word vector matrix of the word in the spoken text information.

The word feature module 410 is configured to perform 2D feature extraction on the word vector matrix of the word to obtain the word feature of the word.

In an optional implementation, the spoken language processing apparatus 400 further includes a text correction module.

The text correction module is configured to correct the spoken text information according to the effect of the word on the fluency of the spoken text information to obtain target text information.

In an optional implementation, the spoken language processing apparatus 400 further includes a text understanding module.

The text understanding module is configured to perform natural-language understanding on the target text information.

The spoken language processing apparatus provided by the embodiment of the present disclosure may perform the spoken language processing method provided by any embodiment of the present disclosure and has function modules and beneficial effects corresponding to the performed method.

Operations, including acquisition, storage, and application, on scene image data and scene point cloud data involved in the technical solution of the present disclosure conform to relevant laws and regulations and do not violate the public policy doctrine.

According to embodiments of the present disclosure, the present disclosure further provides an electronic device, a readable storage medium, and a computer program product.

Figure 5:
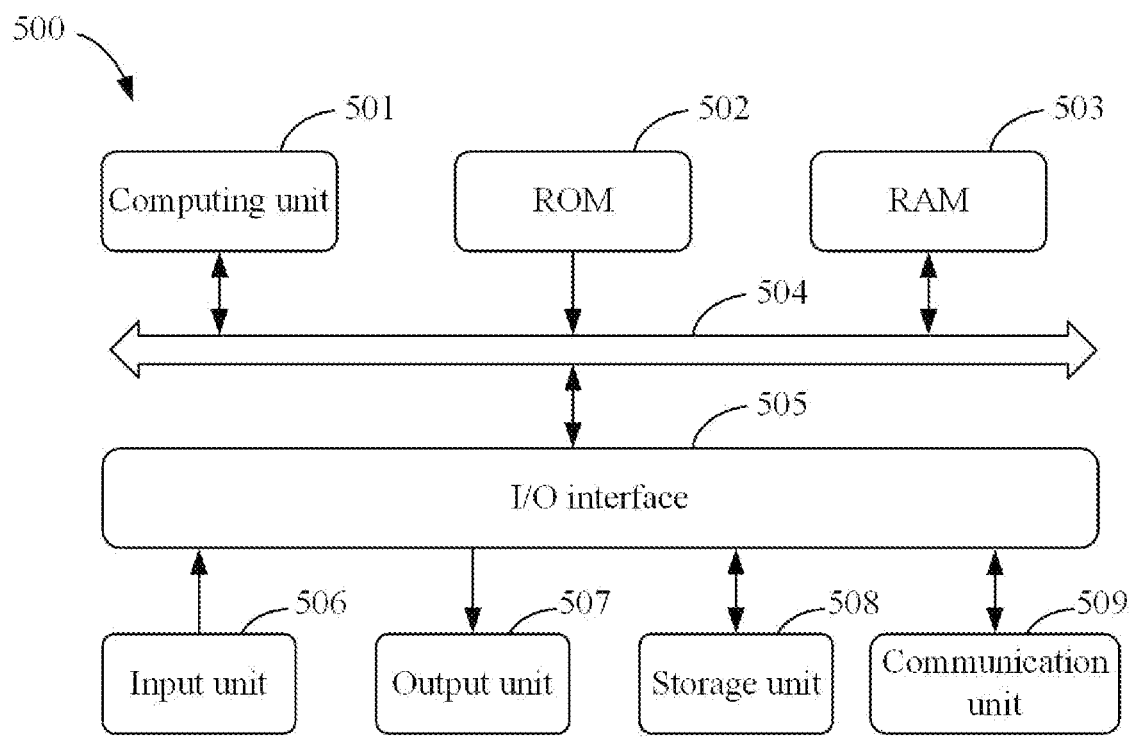
FIG. 5 is a block diagram of an electronic device for implementing a spoken language processing method according to an embodiment of the present disclosure.

FIG. 5 is a block diagram illustrative of an exemplary electronic device 500 that may be used for implementing embodiments of the present disclosure. The electronic device is intended to represent various forms of digital computers, for example, laptop computers, desktop computers, worktables, personal digital assistants, servers, blade servers, mainframe computers, and other applicable computers. The electronic device may also represent various forms of mobile devices, for example, personal digital assistants, cellphones, smartphones, wearable devices, and other similar computing devices. Herein the shown components, the connections and relationships between these components, and the functions of these components are illustrative only and are not intended to limit the implementation of the present disclosure as described and/or claimed herein.

As shown in FIG. 5, the electronic device 500 includes a computing unit 501. The computing unit 501 may perform various appropriate actions and processing according to a computer program stored in a read-only memory (ROM) 502 or a computer program loaded into a random-access memory (RAM) 503 from a storage unit 508. Various programs and data required for operations of the electronic device 500 may also be stored in the RAM 503. The computing unit 501, the ROM 502, and the RAM 503 are connected to each other through a bus 504. An input/output (I/O) interface 505 is also connected to the bus 504.

Multiple components in the electronic device 500 are connected to the I/O interface 505. The multiple components include an input unit 506 such as a keyboard and a mouse, an output unit 507 such as various types of display and speaker, the storage unit 508 such as a magnetic disk and an optical disk, and a communication unit 509 such as a network card, a modem, and a wireless communication transceiver. The communication unit 509 allows the electronic device 500 to exchange information/data with other devices over a computer network such as the Internet and/or over various telecommunication networks.

The computing unit 501 may be various general-purpose and/or special-purpose processing components having processing and computing capabilities. Examples of the computing unit 501 include, but are not limited to, a central processing unit (CPU), a graphics processing unit (GPU), a special-purpose artificial intelligence (AI) computing chip, a computing unit executing machine learning model algorithms, a digital signal processor (DSP), and any appropriate processor, controller, and microcontroller. The computing unit 501 performs the preceding methods and processing, such as a spoken language processing method. For example, in some embodiments, the spoken language processing method may be implemented as a computer software program tangibly contained in a machine-readable medium such as the storage unit 508. In some embodiments, part or all of a computer program may be loaded and/or installed on the electronic device 500 via the ROM 502 and/or the communication unit 509. When the computer program is loaded onto the RAM 503 and executed by the computing unit 501, one or more steps of the preceding spoken language processing method may be performed. Alternatively, in other embodiments, the computing unit 501 may be configured, in any other suitable manner (for example, by means of firmware), to perform the spoken language processing method.

Herein various implementations of the systems and techniques described above may be implemented in digital electronic circuitry, integrated circuitry, field-programmable gate arrays (FPGAs), application-specific integrated circuits (ASICs), application-specific standard products (ASSPs), systems on chips (SoCs), complex programmable logic devices (CPLDs), computer hardware, firmware, software, and/or combinations thereof. The various implementations may include implementations in one or more computer programs. The one or more computer programs are executable and/or interpretable on a programmable system including at least one programmable processor. The programmable processor may be a special-purpose or general-purpose programmable processor for receiving data and instructions from a memory system, at least one input device, and at least one output device and transmitting data and instructions to the memory system, the at least one input device, and the at least one output device.

Program codes for implementation of the methods of the present disclosure may be written in any combination of one or more programming languages. These program codes may be provided for the processor or controller of a general-purpose computer, a special-purpose computer, or another programmable spoken language processing apparatus to enable functions/operations specified in a flowchart and/or a block diagram to be implemented when the program codes are executed by the processor or controller. The program codes may all be executed on a machine; may be partially executed on a machine; may serve as a separate software package that is partially executed on a machine and partially executed on a remote machine; or may all be executed on a remote machine or a server.

In the context of the present disclosure, the machine-readable medium may be a tangible medium that may contain or store a program available for an instruction execution system, apparatus, or device or a program used in conjunction with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device or any appropriate combination thereof. Concrete examples of the machine-readable storage medium include an electrical connection based on one or more wires, a portable computer disk, a hard disk, a RAM, a ROM, an erasable programmable read-only memory (EPROM) or a flash memory, an optical fiber, a portable compact disc read-only memory (CD-ROM), an optical storage device, a magnetic storage device, or any appropriate combination thereof.

In order that interaction with a user is provided, the systems and techniques described herein may be implemented on a computer. The computer has a display device (for example, a cathode-ray tube (CRT) or a liquid-crystal display (LCD) monitor) for displaying information to the user; and a keyboard and a pointing device (for example, a mouse or a trackball) through which the user can provide input for the computer. Other types of devices may also be used for providing interaction with a user. For example, feedback provided for the user may be sensory feedback in any form (for example, visual feedback, auditory feedback, or haptic feedback). Moreover, input from the user may be received in any form (including acoustic input, voice input, or haptic input).

The systems and techniques described herein may be implemented in a computing system including a back-end component (for example, a data server), a computing system including a middleware component (for example, an application server), a computing system including a front-end component (for example, a client computer having a graphical user interface or a web browser through which a user can interact with implementations of the systems and techniques described herein), or a computing system including any combination of such back-end, middleware, or front-end components. Components of a system may be interconnected by any form or medium of digital data communication (for example, a communication network). Examples of the communication network include a local area network (LAN), a wide area network (WAN), and the Internet.

A computer system may include clients and servers. A client and a server are generally remote from each other and typically interact through a communication network. The relationship between the client and the server arises by virtue of computer programs running on respective computers and having a client-server relationship to each other. The server may be a cloud server, a server of a distributed system, or a server combined with a blockchain.

Artificial intelligence is a discipline studying the simulation of certain human thinking processes and intelligent behaviors (such as learning, reasoning, thinking, and planning) by a computer and involves techniques at both hardware and software levels. Hardware techniques of artificial intelligence generally include techniques such as sensors, special-purpose artificial intelligence chips, cloud computing, distributed storage, and big data processing. Software techniques of artificial intelligence mainly include several major directions such as computer vision technology, speech recognition technology, natural language processing technology, machine learning/deep learning technology, big data processing technology, and knowledge graph technology.

Cloud computing refers to a technical system that accesses a shared elastic-and-scalable physical or virtual resource pool through a network and can deploy and manage resources in an on-demand self-service manner, where the resources may include servers, operating systems, networks, software, applications, storage devices, and the like. Cloud computing can provide efficient and powerful data processing capabilities for model training and technical applications such as artificial intelligence and blockchains.

It is to be understood that various forms of the preceding flows may be used, with steps reordered, added, or removed. For example, steps described in the present disclosure may be executed in parallel, in sequence, or in a different order as long as the desired results of the technical solutions disclosed in the present disclosure are achieved. The execution sequence of the steps is not limited herein.

The scope of the present disclosure is not limited to the preceding embodiments. It is to be understood by those skilled in the art that various modifications, combinations, subcombinations, and substitutions may be made according to design requirements and other factors. Any modifications, equivalent substitutions, improvements, and the like made within the spirit and principle of the present disclosure fall within the scope of the present disclosure.

What is claimed is:

1. A spoken language processing method, comprising:
obtaining spoken text information by collecting speech information and recognizing the speech information through automatic speech recognition;
determining a word feature of a word in the spoken text information;
determining a correlation feature of the word in the spoken text information;
determining an effect of the word on fluency of the spoken text information according to the word feature of the word and the correlation feature of the word; and
correcting the spoken text information according to the effect of the word on the fluency of the spoken text information to obtain target text information so as to improve quality of the spoken text information;
wherein determining the correlation feature of the word in the spoken text information comprises:
determining a word vector matrix of the word in the spoken text information; and
determining the correlation feature of the word according to the word vector matrix of the word; and
wherein determining the correlation feature of the word according to the word vector matrix of the word comprises:
determining a Hadamard product of a word vector matrix of an i-th word and a word vector matrix of a i-th word in the spoken text information;
determining a correlation matrix according to the Hadamard product; and
performing three-dimensional (3D) feature extraction on the correlation matrix to obtain correlation features of the i-th word and the j-th word, and
wherein i and j are natural numbers.

2. The method of claim 1, wherein determining the correlation matrix according to the Hadamard product comprises:
determining relative position encoding of the i-th word and the j-th word in the spoken text information; and
adding the relative position encoding to the Hadamard product to obtain the correlation matrix of the i-th word and the j-th word.

3. The method of claim 1, wherein determining the word vector matrix of the word in the spoken text information comprises:
processing the spoken text information by a language representation model to obtain the word vector matrix of the word in the spoken text information;
determining the word feature of the word in the spoken text information comprises:
performing two-dimensional (2D) feature extraction on the word vector matrix of the word to obtain the word feature of the word.

4. A spoken language processing apparatus, comprising: at least one processor; and a memory communicatively connected to the at least one processor; wherein the memory stores an instruction executable by the at least one processor to enable the at least one processor to perform the following steps:
obtaining spoken text information by collecting speech information and recognizing the speech information through automatic speech recognition;
determining a word feature of a word in the spoken text information;
determining a correlation feature of the word in the spoken text information;
determining an effect of the word on fluency of the spoken text information according to the word feature of the word and the correlation feature of the word; and
correcting the spoken text information according to the effect of the word on the fluency of the spoken text information to obtain target text information so as to improve quality of the spoken text information;
wherein determining the correlation feature of the word in the spoken text information comprises:
determining a word vector matrix of the word in the spoken text information; and
determining the correlation feature of the word according to the word vector matrix of the word; and
wherein determining the correlation feature of the word according to the word vector matrix of the word comprises:
determining a Hadamard product of a word vector matrix of an i-th word and a word vector matrix of a j-th word in the spoken text information;
determining a correlation matrix according to the Hadamard product; and performing three-dimensional (3D) feature extraction on the correlation matrix to obtain correlation features of the i-th word and the j-th word, and wherein i and i are natural numbers.

5. The apparatus of claim 4, wherein determining the correlation matrix according to the Hadamard product comprises:

determining relative position encoding of the i-th word and the j-th word in the spoken text information; and adding the relative position encoding to the Hadamard product to obtain the correlation matrix of the word.

6. The apparatus of claim 4, wherein determining the word vector matrix of the word in the spoken text information comprises:

processing the spoken text information by a language representation model to obtain the word vector matrix of the word in the spoken text information; and determining the word feature of the word in the spoken text information comprises performing two-dimensional (2D) feature extraction on the word vector matrix of the word to obtain the word feature of the word.

7. A non-transitory computer-readable storage medium, which is configured to store a computer instruction for causing a computer to perform the following steps:

obtaining spoken text information by collecting speech information and recognizing the speech information through automatic speech recognition;

determining a word feature of a word in the spoken text information;

determining a correlation feature of the word in the spoken text information;

determining an effect of the word on fluency of the spoken text information according to the word feature of the word and the correlation feature of the word; and correcting the spoken text information according to the effect of the word on the fluency of the spoken text information to obtain target text information so as to improve quality of the spoken text information;

wherein determining the correlation feature of the word in the spoken text information comprises:

determining a word vector matrix of the word in the spoken text information; and determining the correlation feature of the word according to the word vector matrix of the word; and wherein determining the correlation feature of the word according to the word vector matrix of the word comprises:

determining a Hadamard product of a word vector matrix of an i-th word and a word vector matrix of a j-th word in the spoken text information;

determining a correlation matrix according to the Hadamard product; and performing three-dimensional (3D) feature extraction on the correlation matrix to obtain correlation features of the i-th word and the j-th word;

wherein i and i are natural numbers.

8. The storage medium of claim 7, wherein determining the correlation matrix according to the Hadamard product comprises:

determining relative position encoding of the i-th word and the j-th word in the spoken text information; and adding the relative position encoding to the Hadamard product to obtain the correlation matrix of the i-th word and the j-th word.

9. The storage medium of claim 7, wherein determining the word vector matrix of the word in the spoken text information comprises:

processing the spoken text information by a language representation model to obtain the word vector matrix of the word in the spoken text information;

determining the word feature of the word in the spoken text information comprises:

performing two-dimensional (2D) feature extraction on the word vector matrix of the word to obtain the word feature of the word.

* * * * *